United States Patent [19]

Criswell

[11] Patent Number: 4,836,470
[45] Date of Patent: Jun. 6, 1989

[54] AEROSPACE VEHICLE HAVING MULTIPLE PROPULSION SYSTEMS ON A RELATIVELY ROTATABLE FLYING WING

[76] Inventor: David R. Criswell, 4003 Camino Lindo, San Diego, Calif. 92122

[21] Appl. No.: 744,491

[22] Filed: Jun. 13, 1985

Related U.S. Application Data

[63] Continuation-in-part of Ser. No. 536,630, Sep. 28, 1983.

[51] Int. Cl.$^4$ .................. B64C 37/02; B64C 39/10; B64G 1/14; B64G 1/42
[52] U.S. Cl. .................................. 244/2; 244/160; 244/161; 244/46; 244/36; 244/55; 244/12.5
[58] Field of Search .................. 244/2, 36, 46, 15, 56, 244/55, 172, 54, 52, 12.5, 12.3, 161, 158 R, 160, 135 L

[56] References Cited

U.S. PATENT DOCUMENTS

| | | | |
|---|---|---|---|
| 2,823,880 | 2/1958 | Bergeson | 244/135 C |
| 3,295,789 | 1/1967 | Hill | 244/52 |
| 3,438,581 | 4/1969 | Smith | 244/52 |
| 3,737,121 | 6/1973 | Jones | 244/46 |
| 3,820,743 | 6/1974 | Young | 244/4 R |
| 3,971,535 | 7/1976 | Jones | 244/46 |
| 4,265,416 | 5/1981 | Jackson | 244/160 |

FOREIGN PATENT DOCUMENTS 2426061 12/1975 Fed. Rep. of Germany .
735065 8/1955 United Kingdom .
2111929 7/1983 United Kingdom .

Primary Examiner—Galen Barefoot
Attorney, Agent, or Firm—Brown, Martin, Haller & Meador

[57] ABSTRACT

An aerospace vehicle having multiple propulsion systems on a relatively rotatable flying wing capable of takeoff and subsequent landing with intermediate space flight in the manner of a conventional aircraft and rocket, respectively, comprising an elongated wing member having internal passenger and crew, cargo and fuel storage compartments. A plurality of propulsion systems are distributed about the wing member for providing thrust and aerodynamic control. The vehicle also includes rotating means for controlling the direction of the thrust of the propulsion systems relative to the longitudinal axis of the wing whereby to rotate the wing member relative to the direction of flight. The vehicle takes off and lands with the longitudinal wing axis being transverse to the direction of thrust and therefore to the flight direction in a manner similar to that of conventional aircraft. In flight as the vehicle approaches space, the rotating means rotates the longitudinal wing axis into alignment with the direction of thrust of the plurality of propulsion systems and therefore to the direction of flight for suborbital, orbital and space flight in the manner similar to that of conventional rockets.

25 Claims, 5 Drawing Sheets

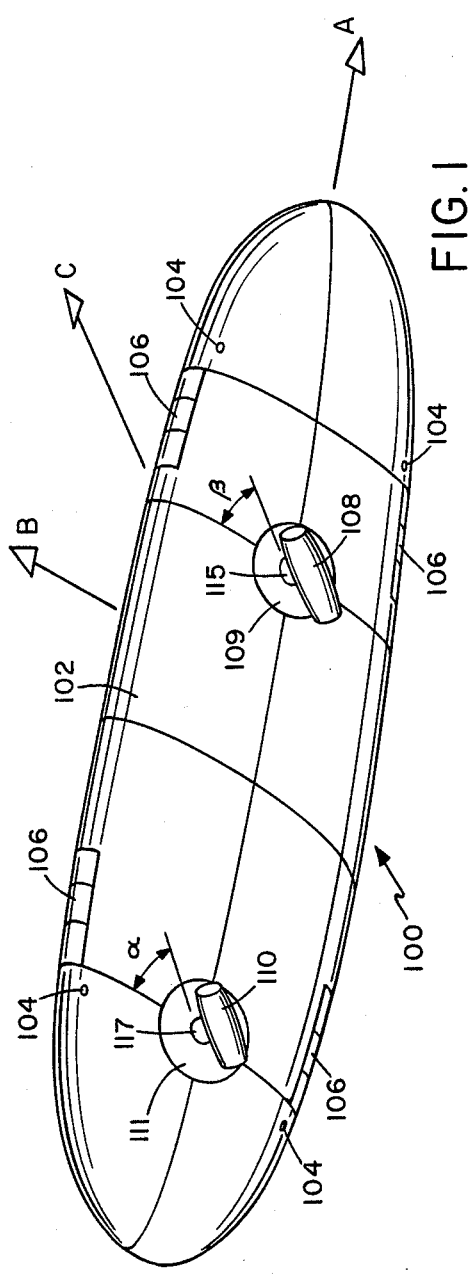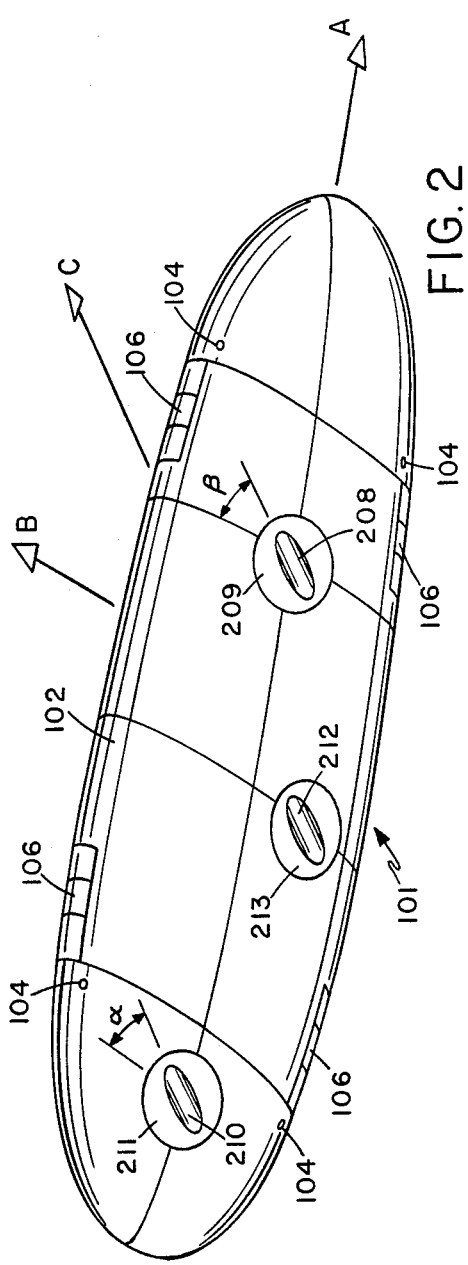

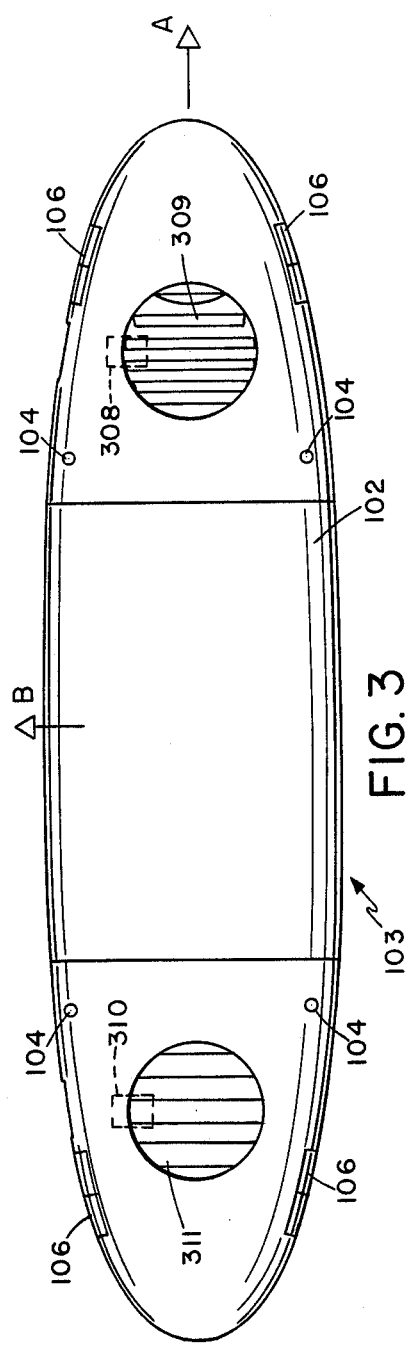
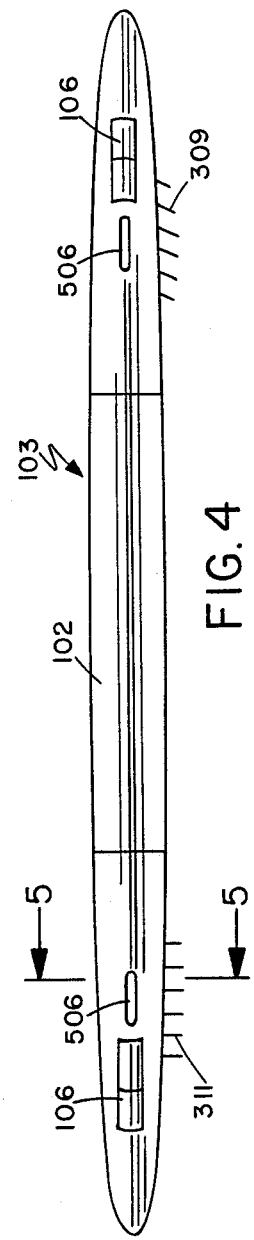
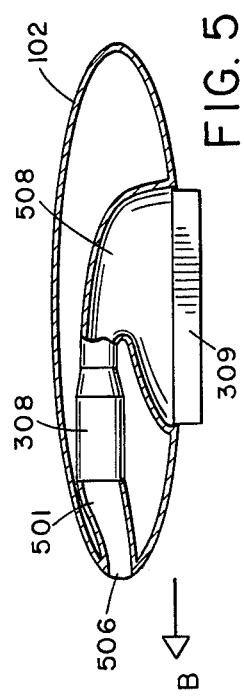
FIG. 3
FIG. 4
FIG. 5

4,836,470

AEROSPACE VEHICLE HAVING MULTIPLE PROPULSION SYSTEMS ON A RELATIVELY ROTATABLE FLYING WING

This application is an continuation-in-part of application Ser. No. 536,630 of the same applicant, filed Sept. 28, 1983 entitled "Swing-Wing Rocket System".

BACKGROUND OF THE INVENTION

The present invention relates to a reuseable aerospace vehicle capable of suborbital, orbital and space flight and particularly to the application of an elongated general elliptical flying wing having multiple propulsion systems each being capable of independent or coupled rotation of their respective directions of thrust relative to the longitudinal axis of the wing and therefore the angle of attack of the wing member to the direction of flight of the vehicle.

The concept of a wing member being directably controllable relative to the flight direction, hereinafter sometimes referred as swing-wing or oblique wing, has been reported in articles by Robert T. Jones, in *Acta Astronautica*, entitled "The oblique Wing—Aircraft Design for Transsonic and Low Supersonic Speeds", printed in 1977, by G. H. Lee in *The Airplane and Astronautics*, entitled "Slewed-wing Supersonics", in 1961, and by Robert T. Jones in U.S. Pat. No. 3,971,535. These articles concluded that at transsonic speeds, a conventional "subsonic" wing turned at an oblique angle to the flow demonstrated lift-drag ratios higher than conventional swept-back or delta-wings. When returned to its straight position, perpendicular to the flow, such a wing minimizes the display of energy and noise in the airport environment. These articles reported that turning the wing as a unit about a pivot at the fuselage is definitely superior to the usual variable sweep arrangement, both structurally and aerodynamically. By setting the wing in a straight position one can minimize the power and hence the noise during takeoff. On short flights, where speed is not all important, the wing may be kept in the straight position to maximize fuel economy. For longer overland flights, the aircraft may be trimmed to fly just below the speed of sound, "sonic boom speed limit" of approximately 760 miles per hour ground speed. For transoceanic flight, the sweep angle may be set for a flight Mach number well into the supersonic range. These articles concluded that oblique wing aircraft, having the capacity to swing the wing between positions, minimizes drag on the wing and enhance aircraft stability.

While the swing-wing concept has been applied to standard aircraft, there has been little or no application of the swing-wing concept to orbital vehicles, spacecraft, launch vehicles, or other types of rocket-powered devices. In present winged spacecraft technology, the fixed wings of the space shuttle are the state of the art. On the launch rockets themselves, only rudders or stabilizers are incorporated to achieve balance during lift-off. In practice, wings have not been employed in spacecraft other than the space shuttle.

U.S. Pat. Nos. 3,028,122 and 3,120,361 of Riebe et al each relate to an aerospace vehicle in which an elongated hull section can be rotated between positions transverse to the flight direction and aligned with the flight direction. Motor pads are externally mounted midpoint on the hull section via pivotal mounts so as to project upwardly and downwardly from the hull and rotate about a central vertical axis of the hull. In the Riebe configuration, thrust is applied to a single point on the vehicle and therefore provides little or no aerodynamic control for the vehicle. Aerodynamic control and stability must be provided by conventional aerodynamic structures such as, for example, flaps, elevators and rudders.

SUMMARY OF THE INVENTION

According to the present invention, an aerospace vehicle is provided which in its simplest form comprises, in its entirety, an elongated, generally elliptical wing member having a tip to tip longitudinal axis and a plurality of propulsion systems mounted along the length of the wing member. In alternative embodiments, additional flight stages may be incorporated into the wing member and/or propulsion system to provide a multi-stage vehicle. However, and notwithstanding the staging configuration, the composite wing member and distributed plurality of propulsion systems comprise the vehicle's preferred embodiment.

The direction of thrust of the plurality of propulsion systems are independently controllable and distributed longitudinally and non-centrally along the wing member. The independent controllability of the magnitude and the direction of thrust of the multiple propulsion systems provides control of the aerodynamic flight of the wing member and, primarily the direction of flight of the wing member relative to its longitudinal axis. The controllability of the longitudinal wing axis relative to the direction of flight or its oblique angle provides superior flight characteristics for the vehicle. In an alternate embodiment, at least some of the propulsion systems are located within the wing member so that the wing member presents a substantially smooth uninterrupted aerodynamic surface during flight.

Variation of the propulsion systems are designed to provide thrust to the wing member from a direction transverse to the longitudinal axis of the wing member aerodynamic flight to, after complete rotation, a direction in alignment with the longitudinal axis of the wing member, for suborbital, orbital and space flight.

Preferably, the plurality of propulsion systems include primary propulsion devices mounted at positions respectively adjacent opposite ends of the wing member. The primary propulsion devices or, more accurately, the exhaust of the primary propulsion devices are rotatably mounted to the wing member so as to be rotatable between positions transverse to the longitudinal axis during takeoff and landing and aligned with the longitudinal axis during space flight.

The primary propulsion devices may be retractably mounted on the surface or preferably the undersurface of the wing member so as to be retractable between a projecting position and a position substantially retracted into the wing member.

Alternative propulsion devices, for example, air jet engines and/or rocket motors may be mounted inside the wing member with their respective exhaust outlets flush with the surface of the wing member. Such propulsion devices would have controllable exhaust outlets to provide the directional control.

Alternative propulsion systems, for example, rocket engines may be mounted inside the wing member or retractably mounted to the wing surface and capable of being retracted into the wing member. Near space and in space the propulsion systems would each be operated in a generally fixed direction but with variable thrust levels with respect to one another. In this manner, the vehicle could be propelled from the sensible atmosphere to space and in space with minimal relative motion of the propulsion devices with respect to the vehicle.

The wing member would contain conventionally designed internal chambers for fuels and transportable items such as passengers, crew and/or cargo.

Thus it is an advantage of the present invention that an aerospace vehicle is provided which comprises a flying wing member capable of independent aerodynamic and space flight and which can be rotated relative to the flight path so as to minimize drag while providing aerodynamic lift and require substantial less fuel than other types of spacecraft.

In a further alternate embodiment of the invention, the exhaust of the propulsion systems would be directed at least partially downward between the vehicle and the ground to create a surface effect to lift and support the vehicle during landings and takeoffs and thereby eliminate the necessity of landing gear. In this alternative embodiment, the exhaust of the propulsion systems would create an air cushion between the vehicle and the ground whereby to raise the vehicle off the ground and simultaneously provide forward thrust to the wing member, during takeoff, so as to permit the natural and gradual takeoff of the wing member. Aerodynamic control of the wing member during aerodynamic flight would be maintained through the directably controllable propulsion systems. Similarly, upon landing, the wing member and propulsion systems would create a ground effect which would provide an air cushion for the vehicle thereby to eliminate the necessity to conventional landing gear.

Accordingly, it is an object of the present invention to provide an aerospace vehicle having a wing member and a plurality of propulsion system for aerodynamic flight and which vehicle uses aerodynamic flight for takeoff and landing and an oblique rotated wing member for space flight while using substantially less propellant than required for conventional vertical takeoff rocket systems.

It is another object of the present invention to provide a vehicle that requires smaller propulsion systems than that required by conventional vertical takeoff rockets systems for either a recoverable first stage wing member of a multiple stage vehicle or a single stage orbital winged member vehicle.

It is another object of the present invention to provide a spacecraft employing a swing wing for aerodynamic properties using controllable and directable thrust of a plurality of propulsion systems for horizontal takeoff, flight and landing.

BRIEF DESCRIPTION OF THE DRAWINGS

The above described and other objects, advantages and features of the present invention will become more readily apparent from a review of the following specifications when taking in conjunction with the drawings wherein:

FIG. 1 is a bottom perspective view of the swing wing aerodynamic vehicle of the present invention showing the wing member in partial rotation from aerodynamic takeoff to space flight.

FIG. 2 is a bottom perspective view of the alternate embodiment of a swing wing aerodynamic vehicle of the present invention having internal propulsion means.

FIG. 3 is a bottom view of an alternative embodiment of the swing wing aerodynamic vehicle having internal propulsion system showing possible configurations for the vented exhaust.

FIG. 4 is a frontal elevational view of the swing wing vehicle of FIG. 3.

FIG. 5 is a diagrammatic representation of a sectional view of the aerodynamic vehicle taken along line 5—5 of FIG. 4.

DESCRIPTION OF THE PREFERRED EMBODIMENT

Figure 6:
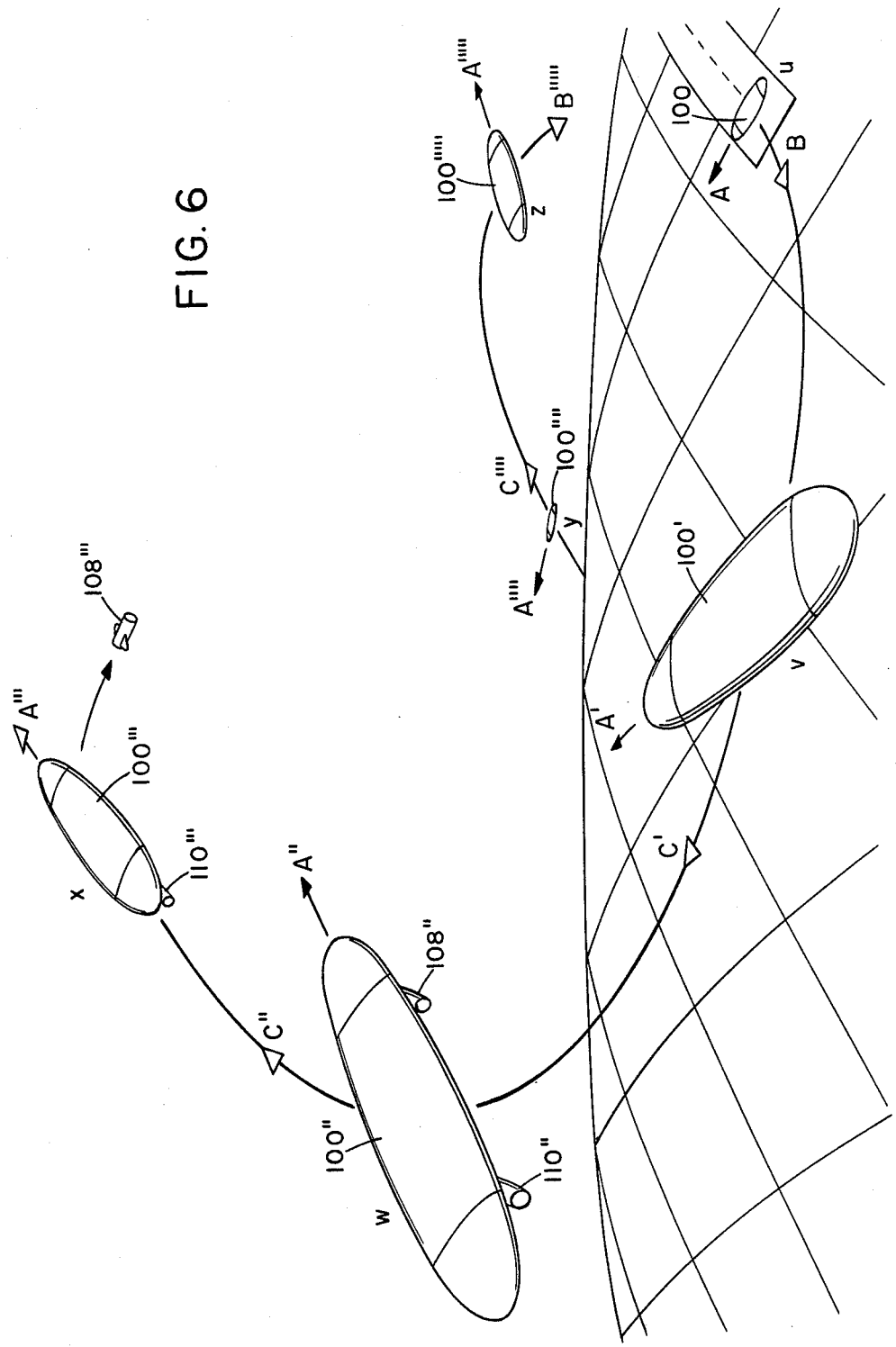
FIG. 6 is a diagrammatic representation of the aerodynamic vehicle of the present invention showing sequential phases of flight.

The swing wing aerodynamic vehicle of the present invention is shown generally at 100 in FIG. 1. The swing wing aerodynamic vehicle 100 comprises an elongated wing member 102 and a plurality of relatively rotatable propulsion systems 110 and 108. Wing member 102 may include aerodynamic control surfaces 106 positioned about the forward and aft edges of the wing member 102. These aerodynamic control surface 106 would provide aerodynamic stability and control to the swing wing of this embodiment.

The propulsion system includes first motor 108, and second motor 110 plus respective rotation control devices 109 and 111.

The first and second motors 108 and 110 are rotatably connected to the wing member at respective control rotation couplings 115 and 117. Further, the exhausts of the respective motors are controllable relative to the horizontal plane of the wing member by controllable exhaust gimbaling to control the attitude of the exhaust.

In the preferred embodiment, the first and second motors 108 and 110 may be any combination of either conventional air breathing jet engines for low altitude aerodynamic flight or rocket motors using internal fuel storage facilities for space flight. In the preferred embodiment motor 110, the rearward motor relative to the direction of space flight, would be a rocket motor.

As seen in FIG. 1, first motor 108 is pivoted about its rotatable coupling 115 by an angle represented by angle beta. Similarly, second motor 110 is pivoted about an angle alpha. In this configuration, the vehicle, having relatively rotatable propulsion systems each of which having controllable gimbaled exhaust is capable of controlled aerodynamic and space flight. The addition of aerodynamic control surfaces 106 and reaction control or additional propulsion system elements 104 provide increased control and flexibility for control flight of the vehicle. Additional propulsion elements 104 provide control of the directional attitude of the wing member relative to the flight direction.

In FIG. 1, the arrows represent the position of the wing member 102 relative to the direction of flight of the aerodynamic vehicle 100. During takeoff, wing member 102 will have its longitudinal axis A generally perpendicular to the direction of takeoff B When approaching supersonic flight speeds, wing member 102 will rotate through the controlled rotatable movement of the propulsion systems 108 and 110 to flight direction C forming an oblique angle to the longitudinal axis A. During space flight, the longitudinal axis A of the wing member 102 will be directed so as to be generally aligned with the direction of flight A. In this embodiment, the thrust control and rotational control of propulsion systems relative to the wing member provides aerodynamic flight controls plus control for the rotation of the wing member relative to its direction of flight for reduced aerodynamic drag as vehicle speed increases. The present invention offers a number of advantages not found in the prior spacecraft systems. This system allows the aerodynamic vehicle to achieve orbit with smaller engines by using aerodynamic lift to propel the vehicle to higher altitudes and supersonic flight. In addition, the present invention is able to take advantage of aerodynamic properties for horizontal takeoffs and landings. Additionally, the vehicle can be operated in a much less stressful manner through the swing wing system than is available in other types of rocket launch systems.

It should be noted that the propulsion systems of the present invention are a matter of conventional design choice. For example, rocket motors could use a variety of different fuels and combinations of oxidizers. Also, various types of jet engines could be used as air breathing propulsion systems. Obviously, space flight requirements dictate the applications of rocket motors having on-board reaction mass during the space flight phase.

In the embodiment shown in FIG. 1, conventional landing gear means (not shown) could be provided in the manner shown and described by Walley in U.S. Pat. Nos. 3,672,606 or by Jackson, et al in 4,265,416 enabling conventional takeoffs and landing of the aerodynamic swing wing vehicle.

Accordingly, in this embodiment, either retractable landing gear or detachable running gear would satisfactorily permit appropriate takeoffs and landing of the vehicle. The landing gear and internal wing structure would have to be of sufficient strength to support the full takeoff weight of the vehicle.

The operation of the present invention is described hereinafter. Initially, the system 100 is transported on conventional landing gear for takeoff. At this time, wing member 102 is arranged generally transverse to takeoff direction B. For takeoff, motors 108 and 110 are employed so as to provide sufficient thrust to move the swing wing aerodynamic vehicle 100. Eventually, the system 100 has accelerated to a point sufficient that aerodynamic lift occurs and the system lifts and takes off. Following takeoff and during initial climb-out, the system 100 will begin to accelerate and gain altitude and speed. As the vehicle continues to gain speed, the controllably rotating engines 108 and 110 will provide continued thrust against the relative wind or the direction of travel. During increasing speed, the rotation control device 109 and 111 will cause motors 108 and 110 to rotate relative to the longitudinal axis A of the wing member 102 such that one wing tip will advance relative to the direction of travel so that the swing wing 102 presents less and less projected cross-sectional area to the airstream. In this way, the drag of the coefficient of lift and drag of the wing 102 is decreased. While this is occurring, the increasing speed of the vehicle continues to provide sufficient lift to cause the system to climb further toward the upper atmosphere.

The purpose of the swing-wing arrangement is to dynamically optimize the speed, drag and aerodynamic lift of the vehicle during the continuum of speed, altitude and air densities during an earth to space flight. Such an oblique or swing wing holds drag down significantly even through Mach 1 and to approximately Mach 2. This is important because nominal drag peaks about Mach 1. Horizontal takeoff systems, whether powered by rockets or jets, must have sufficient power to push their way through the drag peak at about Mach 1. In the present invention, the drag peak is not as large and the system can proceed to high altitude with minimal nee for special increments of thrust or propellant combustions due to the relatively gentle passage through the sonic barrier.

As altitude increases and the mass of the vehicle 100 decreases, due to the burning of the propellant, the vehicle will make a transition from jet propelled and rocket assisted aerodynamic flight to ballistic space flight. This is accomplished by further rotation of the propulsion system namely, engines 108 and 110 so that they are generally aligned with the longitudinal axis A of wing member 102. The swing wing aerodynamic vehicle 100 will begin to change in it lift characteristics as its approaches and exceeds Mach 2. The shock wave will form further down the wing 102 from its leading edge. The center of lift will move further towards the trailing edge. For this reason the dense hydrocarbons and liquid oxygen propellants must be contained in several different tanks or suitably baffled tanks along the length of the wing member 102. The propellants are drawn from these various tanks so as to continually let the center of mass of the system track the aft motion of the center of lift. In addition, aerodynamic control surfaces 106 within the wing 102 may be provided and used so as to control lift distribution along the longitudinal axis of the wing.

As the vehicle 100 leaves the sensible atmosphere, the consumption of propellant and gimbaled motor 110 exhausts is controlled so that the thrust vector of the motor 110 remains through the center of mass of the system. This is achieved by gimbaling the rocket motor 110 thrust line, by continuing selective draining of fuel and oxidizer tanks, and by transferring propellant to forward tanks. However, since the aerodynamic forces are not severe in the outer atmosphere, careful tank design and gimbaled motor control can serve these purposes sufficiently. Once the vehicle 100 is in orbit, the motors 110 and 108 would be aligned with the longitudinal axis of the wing.

Appropriate heat shielding such as tiles or functionally similar materials may be provided on the surface of the wing to allow the smooth distribution of heat along the surface of the wing during reentry. Further, engine 108 either as a air breathing jet engine or rocket engine may be jettisoned.

For additional aerodynamic stability and control conventional pitch, role and yaw flight control surface (not shown) could be adopted to the vehicle 100. In some configuration the flight control surfaces could be retractable as is generally described by Riebe, et al in U.S. Pat. No. 3,120,361. FIG. 2 shows an alternate embodiment of the aerodynamic vehicle generally at 101 wherein the plurality of propulsion system comprise multiple motors 210, 208, and 212. The motors 208, 210 and 212 of the alternative embodiment shown in FIG. 2 have been mounted inside the wing member 102 itself such that only the exhausts are shown protruding through the bottom of the surface of the aerodynamic vehicle 101. In this configuration, the wing member 102 presents a substantially smoother aerodynamic lift member to its direction of flight. The rocket engines may include rotatably gimbaled exhaust members as represented at 209, 211 and 213 whereby to provide attitude control of the aerodynamic vehicle 101. The propulsion system shown in FIG. 2 includes engines 212 mounted upon the center line within the wing member 102 which may be, for example, a jet engine to provide low altitude thrust and aerodynamic control.

The aerospace vehicle 101 shown in FIG. 2 uses the propulsion system to provide an exhaust through the bottom surface of the wing member 102 and create a ground effect cushion of air between the ground and the vehicle 101 to lift it off the ground while simultaneously providing forward thrust. As the vehicle 101 moves through the air, additional lift is created to gradually provide for takeoff. Accordingly, in this configuration stresses of the weight of the vehicle are distributed evenly along the entire bottom surface of the wing member 102.

Depending upon the airflow design of the wing member 102 substantial lift could be imparted to the vehicle 101 at relatively low air speeds. Because the weight per unit area of the vehicle 101 distributed throughout the entire horizontal surface area of the wing member is relatively small, takeoffs without landing gear is possible using the ground effect air cushion.

The removal of landing gear from the vehicle 101 would provide substantial economies as the removal of landing gear sufficiently large to accommodate the weight of the vehicle 101 would allow for a substantially increased payload.

Accordingly, in this alternative embodiment of the aerospace vehicle 101 and with the propulsion system moved internally to the wing member 102, substantial additional flexibility is achieved by taking advantage of the ground effect provided by the large surface area of the wing member 102 upon landings and takeoffs. In all other aspects, the flight and characteristics would be analogous to the aerodynamic vehicle 100 shown in FIG. 1.

In all configurations of the aerodynamic vehicle, appropriate chambers within the wing member would be provided for crew and passenger accommodations. Specifically, the crew accommodations would include appropriate means for controlling all phases of the flight of the vehicle.

In an alternative configuration of vehicle 101, the propulsion systems 208, 210 and 212 may be retractably mounted to retractable gimbaled exhaust members 209, 211 and 213. In this configuration, the propulsion systems would be located on the surface and aerodynamic considerations dictate they would be retracted into the wing member itself.

FIG. 3 is a representation of a bottom plan view of the aerodynamic lift vehicle 13 similar to that shown in FIG. 2 wherein the exhausts of motors 310 and 308 are provided with corresponding exhaust vanes 309 and 311. In all other aspects, the operation and control of the aerodynamic vehicle 103 is similar to that shown in FIG. 2.

The exhaust vanes 309 and 311 are independently controllable to provide rotation and thrust angle. In this fashion the vanes 309 and 311 would act as conventional thrust reversers to direct the thrust of the respective motors 308 and 310 in an attitude to provide controllable thrust direction.

FIG. 4 is a frontal view of the aerodynamic vehicle 103 shown in FIG. 3 showing the relative orientation of the exhaust vanes 309 and 311.

FIG. 5 is a diagrammatic representation of a sectional view of the aerodynamic vehicle 103 taken along line 5—5 of FIG. 4. As shown in FIG. 5, air intakes shown in dashed lines 501 may be provided from a leading edge duct 506 of the wing member 102 to corresponding motors 308 when using, for example, jet engines. The motor 308 exhaust duct 508 ducts the motor exhaust to the controllable exhaust vanes 309. In an alternative configuration the motor 308 may be a rocket engine, with the air intake 506 and the leading edge of duct 506 being eliminated.

The particular cross sectional shape of the wing member would be developed according to aerodynamic design criteria. Further, the plan view of the aerodynamic vehicle 6 would be developed according to aerodynamic design criteria including, for example, the criteria described by Jones in U.S. Pat. No. 3,971,535.

FIG. 6 is a sequential diagrammatic representation of the aerodynamic vehicle 100 shown in various stages of flight. The vehicle 100 is shown at position °u' during takeoff having the longitudinal axis A of the wing member 102 perpendicular to the direction of flight B.

At °v', the vehicle 100' is accelerating through the atmosphere with the longitudinal axis A' of the wing member 102' slightly in rotation relative to the direction of flight C' As shown at °w' and as the wing member reaches supersonic speeds, longitudinal axis A" of wing member 102" is further rotated relative to the direction of flight C" as demonstrated by the oblique angle between the respective direction of the engines 108" and 110" relative to the longitudinal axis A" of the wing member 102".

At °x' the longitudinal axis A''' of the wing member 102''' is oriented in the direction of flight A''' and the thrust provided by engine 110'''. In the embodiment shown, forward engine 108''' may be jettisoned and abandoned or returned by independent flight to earth for retrieval.

Upon reentry, as shown remotely at °y' the longitudinal axis A'''' of the wing member 100'''' is oriented oblique to the direction of flight C'''' of the vehicle.

Upon approach to landing at °z' the orientation of the longitudinal axis A''''' of the wing member 102''''' is shown perpendicular to the direction of flight B'''''.

Figure 7:
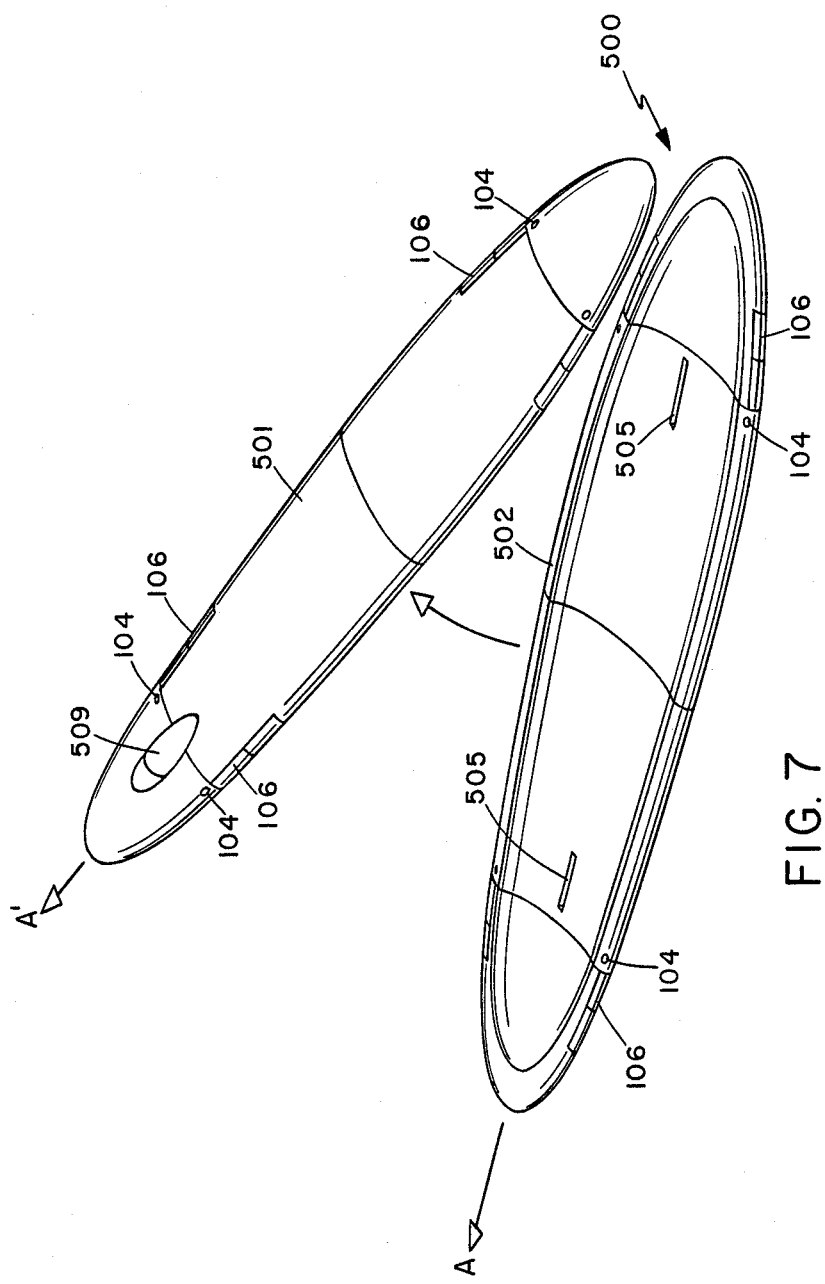
FIG. 7 is a diagrammatic representation of one alternative of the staging of the aerodynamic vehicle of the present invention.

FIG. 7 is a diagrammatic representation of an alternate embodiment of an aerodynamic vehicle 500 shown in staged configuration. In the staged configuration, the described plurality of propulsion systems described and shown in FIG. 1 or FIG. 2 may be employed. The staged configuration included a staged member 501 and a wing member 502. The stage member 501 may be, for example, detachably mounted at 505 to the bottom surface of wing member 502 in nested configuration whereby to provide an overall aerodynamic cross-section surface. Upon staging the wing member 502 and stage member 501 would be separated enabling either member to be returned to earth with the other member remaining in space flight. In the configuration shown in FIG. 7, the wing member 502 would be returned to earth for reuse while nesting stage member 501 would remain in orbit. The design of the staged configuration relative to which member would remain in orbit and which member would be retrieved would be a matter of design choice. Crew facilities are shown at 509 to provide facilities for on board personnel to control the operation of the vehicle 500.

The vehicle 500 shown in FIG. 7 would include structural elements similar to those discussed for the preferred embodiment vehicle 100 of FIG. 1 where like reference numerals refer to like structure. Not visible in FIG. 7 are the primary propulsion elements 108,110 which will be located on the top or outer surface of the wing member 502 remote from its face attached to the stage member 501.

Numerous alternative configurations vehicles could be adopted and developed depended upon the circumstances and criteria of a given flight objectives.

Although preferred embodiments of the invention have been described above by way of example, it is understood, by those skilled in the field that modifications may be made to the disclosed embodiment which are within the scope of the invention as defined by the appended claims.

What I claim is:

1. An aerospace vehicle, comprising:
    an elongated, generally elliptical wing member capable of independent flight and having a central plane, top and bottom surfaces and a unique tip to tip longitudinal axis with a leading edge to trailing edge aerodynamic cross sectional shape;
    a plurality of propulsion means mounted asymmetrically and non-centrally about the wing member for selectively providing thrust to said wing member; and
    control means for independently controlling the direction and magnitude of thrust of each of said plurality of propulsion means to provide a net thrust vector controllable in attitude relative to the central plane of the wing member and moveable between directions transverse to the longitudinal axis of the wing member during take-off and aligned with the longitudinal axis during flight;
    at least one of said propulsion means being offset from the longitudinal axis of the wing member so that it is positioned to the rear of the wing member during take-off, and at least one of said propulsion means being positioned to the rear of said wing member during flight.

2. The aerospace vehicle according to claim 1, wherein said propulsion means include primary propulsion means for driving said wing member into earth orbit, at least some of said primary propulsion means including means for directing thrust to provide an air cushion below the wing member to support it during landing and takeoff.

3. The aerospace vehicle according to claim 1 wherein at least some of said propulsion means are rotatably mounted on said wing member, said control means comprising means for rotating said propulsion means relative to the longitudinal axis of said wing and central plane of said wing to control the thrust direction and to control the flight characteristics of said wing member.

4. The aerospace vehicle according to claim 1, wherein said one propulsion means positioned to the rear of said wing member during flight comprises a primary propulsion means mounted at a position behind the center of gravity of said wing member when the direction of thrust of said primary propulsion means is aligned with the longitudinal axis of said wing member.

5. The aerospace vehicle according to claim 4, wherein said primary propulsion means is a rocket motor and is rotatably mounted on the lower surface of said wing member, said control means comprising means for controlling the attitude of said rocket motor relative to the central plane of said wing member and the direction of said rocket motor relative to the longitudinal axis of said wing member.

6. The aerospace vehicle according to claim 5 wherein at least one of said propulsion means is detachably and rotatably mounted to said wing member for separation during flight of said vehicle.

7. The aerospace vehicle according to claim 1, wherein at least some of said plurality of propulsion means comprise an engine mounted internal to said wing member having an exhaust directed externally to the wing member.

8. The aerospace vehicle according to claim 1 wherein said wing member is capable of independent flight and comprises a one-piece monolithic aerospace vehicle, and wherein said wing member has no major protrusions on its surface.

9. An aerospace vehicle according to claim 1, wherein said wing member has internal propellant chambers for supplying propellant to at least some of said propulsion means, and means for controlling the center of mass of the vehicle during flight by draining selected chambers of propellant and transferring propellant between selected chambers.

10. The aerospace vehicle according to claim 9 wherein said wing member has additional internal chambers and at least some of said additional internal chambers comprise cargo bays.

11. The aerospace vehicle according to claim 10 wherein at least one of said additional internal chambers comprises a passenger chamber which chamber includes said means for controlling the flight of said vehicle.

12. The aerospace vehicle according to claim 1, wherein at least some of said propulsion means comprise rocket engines.

13. The aerospace vehicle according to claim 1, wherein at least some of said propulsion means are mounted to provide their respective thrusts downwardly relative to said wing member such that when the vehicle is or near the ground, the exhaust is vented between the wing member and the ground whereby to create a cushion of air which is sufficient to support the vehicle during takeoffs and landings.

14. The aerospace vehicle according to claim 1 wherein said propulsion means include primary rocket propulsion means of sufficient capability to drive said vehicle into earth orbit and said primary rocket propulsion means are mounted internally to said wing member, and wherein said vehicle further includes duct means coupled to the exhaust of said propulsion means for venting said exhaust and wherein said wing member comprises the entire body of said aerospace vehicle.

15. The aerospace vehicle according to claim 1, wherein said wing member comprises an internal one-piece streamline body portion having generally rounded longitudinal ends.

16. The aerospace vehicle according to claim 1 wherein said control means comprise means for controlling the tilt of the thrust of said plurality of propulsion means relative to the central plane of the vehicle and means for controlling the direction of the thrust relative to the longitudinal axis of the vehicle.

17. The aerospace vehicle according to claim 1 wherein at least some of said plurality of propulsion means comprise air breathing jet engines and some of said plurality of propulsion means comprise rocket engines, the rocket engines being located near to a first longitudinal end of the wing and at least some of the jet engines being located adjacent the opposite end of the wing, the first longitudinal end of the wing comprising the rear end during space flight.

18. The aerospace vehicle according to claim 1, further comprising flight control means for controlling the pitch yaw and roll of the vehicle.

19. The aerospace vehicle according to claim 1, wherein said propulsion means include separately directable primary propulsion means mounted adjacent opposite ends of said wing member.

20. An aerospace vehicle, comprising:
   an elongated generally elliptical wing member having top and bottom surfaces, a major central plane between said surfaces, and a tip to tip longitudinal axis with a leading edge to trailing edge aerodynamic cross-sectional shape;
   a plurality of propulsion means mounted asymmetrically and non-centrally along the wing member;
   said propulsion means including rotatably mounted primary rocket propulsion means of sufficient capability to drive said wing member into earth orbit, said primary rocket propulsion means being mounted adjacent one end of said wing member and being rotatable to adjust the tilt of the thrust of said propulsion means with respect to the central plane of the vehicle and to direct the thrust of said propulsion means between positions transverse to the longitudinal axis of said wing member for take off and aligned with the longitudinal axis of said wing member during space flight, said one end comprising the rear end of said wing member during space flight;
   control means for controlling the direction and magnitude of thrust of said plurality of propulsion means; and
   said propulsion means being located predominantly to the rear of said wing member both in the take off and flight orientations of said wing member relative to the flight direction.

21. The aerospace vehicle according to claim 20, wherein said propulsion means further includes auxiliary thrust devices mounted internally to said wing member for providing directional attitude of said wing member relative to the direction of flight.

22. A multi-stage aerospace vehicle comprising:
   a generally elliptical elongated wing member having a top and bottom surface and a unique tip to tip longitudinal axis with a leading edge to trailing edge aerodynamic cross-sectional shape;
   at least one additional stage member detachably mounted to the bottom surface of said wing member with its longitudinal axis aligned with the longitudinal axis of said wing member to provide a generally aerodynamic overall cross-sectional shape;
   a plurality of propulsion means attached to said wing member for providing thrust to said vehicle;
   means for controlling the direction of thrust of said plurality of propulsion means between angles perpendicular to the longitudinal axis of said wing member and an angle aligned with the longitudinal axis of said wing member;
   said propulsion means comprising means for propelling said vehicle into at least earth orbit; and
   said stage member being of equivalent wing-like shape to said wing member, and said stage member and said wing member each being capable of independent controlled flight after separation.

23. The multi-stage aerospace vehicle according to claim 22 wherein said propulsion means includes means for controllably returning said wing member to earth.

24. The multi-stage aerospace vehicle according to claim 22 wherein said propulsion means includes means for controllably returning said stage member to earth.

25. An aerospace vehicle comprising an elongated elliptical wing member having a unique tip to tip longitudinal axis, a major central plane, and an aerodynamic cross-sectional shape;
   a plurality of propulsion means mounted along the wing member for providing thrust to said wing member in fixed directions relative to the longitudinal axis of said wing member;
   control means for controlling the magnitude of thrust of each of said propulsion means relative to the other propulsion means to vary the tilt of the overall thrust relative to the horizontal plane and to vary the direction of the overall thrust between directions transverse to the longitudinal axis of the wing member during take off and aligned with the longitudinal axis of the wing member during flight; and
   said propulsion means being mounted asymmetrically along the wing member and including at least one propulsion means offset from the longitudinal axis of said wing member, the majority of said propulsion means being positioned to the rear of the transverse center line of the vehicle in its flight orientation.

* * * * *